(12) United States Patent
Sheets et al.

(10) Patent No.: US 9,298,531 B1
(45) Date of Patent: *Mar. 29, 2016

(54) WATCHDOG TIMER WITH MODE DEPENDENT TIME OUT

(71) Applicant: Cypress Semiconductor Corporation, San Jose, CA (US)

(72) Inventors: Michael Sheets, Castle Rock, CO (US); David G. Wright, Woodinville, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/635,361

(22) Filed: Mar. 2, 2015

Related U.S. Application Data

(63) Continuation of application No. 13/765,524, filed on Feb. 12, 2013, now Pat. No. 8,977,911, which is a continuation of application No. 12/752,946, filed on Apr. 1, 2010, now Pat. No. 8,375,258.

(60) Provisional application No. 61/237,273, filed on Aug. 26, 2009.

(51) Int. Cl.
*G06F 11/00* (2006.01)
*G06F 11/07* (2006.01)
(52) U.S. Cl.
CPC ........ *G06F 11/0757* (2013.01); *G06F 11/0793* (2013.01)
(58) Field of Classification Search
None
See application file for complete search history.

(56) References Cited

U.S. PATENT DOCUMENTS

| | | | |
|---|---|---|---|
| 5,961,622 A * | 10/1999 | Hudson | G06F 11/141 710/107 |
| 5,978,939 A | 11/1999 | Mizoguchi et al. | |
| 6,260,162 B1 | 7/2001 | Typaldos et al. | |
| 6,484,217 B1 | 11/2002 | Fuente et al. | |
| 6,643,734 B2 | 11/2003 | Mabuchi et al. | |
| 6,952,753 B2 | 10/2005 | Ralphs | |
| 7,308,617 B2 | 12/2007 | Artobello et al. | |
| 7,506,218 B2 | 3/2009 | Gilgen et al. | |
| 7,707,464 B2 | 4/2010 | Gilgen et al. | |
| 7,949,891 B2 | 5/2011 | Namiki | |
| 2003/0204792 A1 | 10/2003 | Cahill et al. | |
| 2008/0010563 A1 | 1/2008 | Nishimura | |
| 2008/0052543 A1 | 2/2008 | Sokorac | |

OTHER PUBLICATIONS

USPTO Advisory Action for U.S. Appl. No. 12/752,946 dated Feb. 27, 2012; 3 pages.
USPTO Final Rejection for U.S. Appl. No. 12/752,946 dated Nov. 6, 2012; 5 pages.
USPTO Final Rejection for U.S. Appl. No. 12/752,946 dated Dec. 22, 2011; 8 pages.
USPTO Non Final Rejection for U.S. Appl. No. 13/765,524 dated Sep. 11, 2014; 8 pages.
USPTO Non-Final Rejection for U.S. Appl. No. 12/752,946 dated May 24, 2012; 7 pages.

(Continued)

*Primary Examiner* — Yolanda L Wilson (57) ABSTRACT

A method and apparatus to operate a watchdog timer having a first time out period in a processing system. The watchdog timer receives an indication of a change in a mode of operation in the processing system. In response to the change in the mode of operation of the processing system, the watchdog timer changes the time out period to a second time out period corresponding to the new mode of operation.

20 Claims, 4 Drawing Sheets

(56) References Cited

OTHER PUBLICATIONS

USPTO Non-Final Rejection for U.S. Appl. No. 12/752,946 dated Aug. 31, 2011; 7 pages.

USPTO Notice of Allowance for U.S. Appl. No. 12/752,946 dated Dec. 6, 2012; 7 pages.

USPTO Notice of Allowance for U.S. Appl. No. 13/765,524 dated Dec. 31, 2014; 8 pages.

* cited by examiner

WATCHDOG TIMER WITH MODE DEPENDENT TIME OUT

RELATED APPLICATIONS

This application is the continuation of U.S. application Ser. No. 13/765,524. Filed on Feb. 12, 2013, which is a continuation of U.S. application Ser. No. 12/752,946, filed on Apr. 1, 2010, now U.S. Pat. No. 8,375,258 issued on Feb. 12, 2013, and claims the benefit of U.S. Provisional Application No. 61/237,273 filed on Aug. 26, 2009.

TECHNICAL FIELD

This disclosure relates to the field of watchdog timers and, in particular, to a watchdog timer with a mode dependent timeout.

BACKGROUND

Processing systems may utilize watchdog timers to detect errors in software running on the processing system. A watchdog timer is typically implemented as a counter loaded with a specified time out value, which continually counts down from the time out value. Under normal system operation, a reset signal received from the processing system causes the watchdog timer to reload the initial time out value at regular intervals. The reset signal may occur, for example, each time a certain number of lines of software code are executed by the processing system. If the watchdog timer does not receive the reset signal within a given amount of time, as in the case of a software error, the counter runs to zero and triggers a reset of the processing system.

Generally, the time out value of the counter is set during the initial design of the microcontroller or other processing system implementing the watchdog timer. For security purposes, the time out value of the counter is locked during operation of the processing device. Disallowing reconfiguration of the watchdog timer prevents errors in the software from corrupting the watchdog timer and from possibly preventing a system reset.

In certain instances, the processing system may have more than one mode of operation, such as a high speed mode or a low power mode. In a low power mode, for example, the processing system may execute the software code at a lower frequency that in a normal mode. Since the reset signal is provided to the watchdog timer at an interval based on the number of lines of code that have been executed, a lower frequency causes the reset signal to be sent less often. Accordingly, the counter in the watchdog timer is loaded with a large time out value or the counter may reach zero before the next reset signal, mistakenly indicating a software error.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to operate a watchdog timer with mode dependent timeout. The watchdog timer operates with a first time out period in a processing system. A change in a mode of operation of the processing system is detected and an indication of the change is provided to the watchdog timer. The watchdog timer changes the time out period to a second time out period in response to the change in the mode of operation of the processing system. The changing of the time out period may occur without interrupting active operation of the processing system or watchdog timer.

Figure 1:
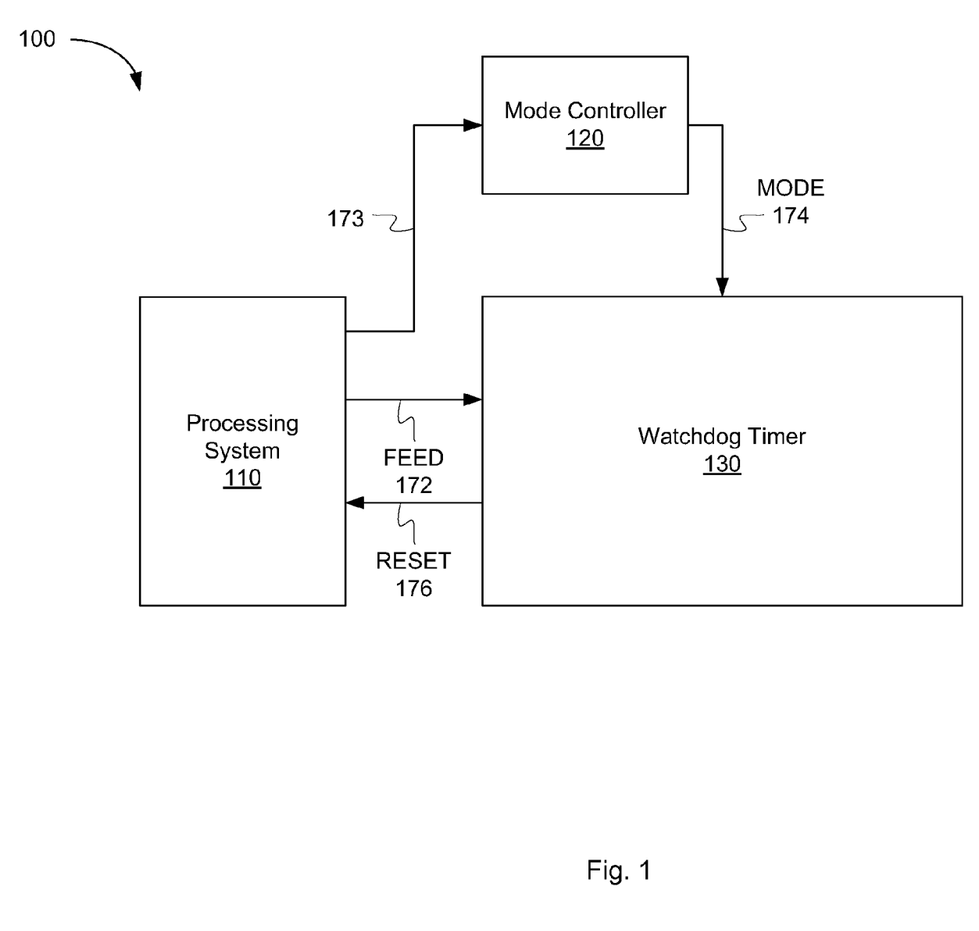
FIG. 1 is a block diagram illustrating a watchdog timer with mode dependent time out according to an embodiment.

FIG. 1 is a block diagram illustrating a watchdog timer with mode dependent time out according to an embodiment of the present invention. In one embodiment, system 100 includes processing system 110, mode controller 120 and watchdog timer 130. In one exemplary embodiment, processing system 110 may be a Programmable System on a Chip (PSoC™) processing device, manufactured by Cypress Semiconductor Corporation, San Jose, Calif. Alternatively, processing system 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing system 110 may be a network processor having multiple processors including a core unit and multiple microengines. Additionally, the processing system 110 may include any combination of general-purpose processing devices and special-purpose processing devices.

As shown in FIG. 1, mode controller 120 and watchdog timer 130 are external to processing system 110. In other embodiments, however, mode controller 120 and watchdog timer 130 may be included on the same chip as processing system 110. Watchdog timer 130 receives FEED signal 172 from processing system 110. FEED signal 172 causes watchdog timer 130 to restart a time out interval. Mode controller 120 receives signal 173 from processing system 110. Based on signal 173, mode controller 120 is able to determine a mode of operation of processing system 110. In one embodiment, processing system 110 may send an indication of its operating mode to mode controller 120 through signal 173. In another embodiment, the indication may be received from some other system resource or a combination of resources. The mode controller 120 may observe the operational state of one or more resources in the processing system 110 and accordingly make a determination of the proper mode of operation. After determining the mode of operation, mode controller 120 provides MODE signal 174 to watchdog timer 130.

Watchdog timer 130 serves to trigger a reset of processing system 110 if software executing on processing system 110 becomes hung or otherwise suffers an error. In one embodiment watchdog timer 130 continually times an interval represented by a time out value, the expiration of which triggers the sending of RESET signal 176 to processing system 110. RESET signal 176 causes processing system to reset, including a reset of the system hardware as well as restarting the system software. Under normal operation, processing system 110 periodically provides FEED signal 172 to watchdog timer 130. FEED signal 172 causes watchdog timer 130 to reload the time out value and begin timing the interval again. As long as processing system 110 is functioning properly, FEED signal 172 is provided in shorter intervals than the time out period represent by the time out value in watchdog timer 130, thereby preventing the count down from expiring.

In one embodiment, the time out value used in watchdog timer 130 is dependent upon the mode of operation of processing system 110. Modes of operation may include a normal mode, a high-speed mode, a low-power mode, and other modes of operation. In different modes of operation of processing system 110, a processing system clock frequency may differ, and in some modes of operation the processing system clock may be stopped for periods of time. The processing system clock may be a different clock signal than a clock used by watchdog timer 130. In one embodiment, watchdog timer 130 may use a fixed clock source, while processing system 110 uses a clock source with a frequency that varies dynamically. As the mode of operation changes, MODE signal 174 causes watchdog timer 130 to alter time out value used, thereby causing the time out period to increase or decrease accordingly. Thus, the time out period of watchdog timer 130 may be changed automatically without intervention from processing system 110.

Figure 2:
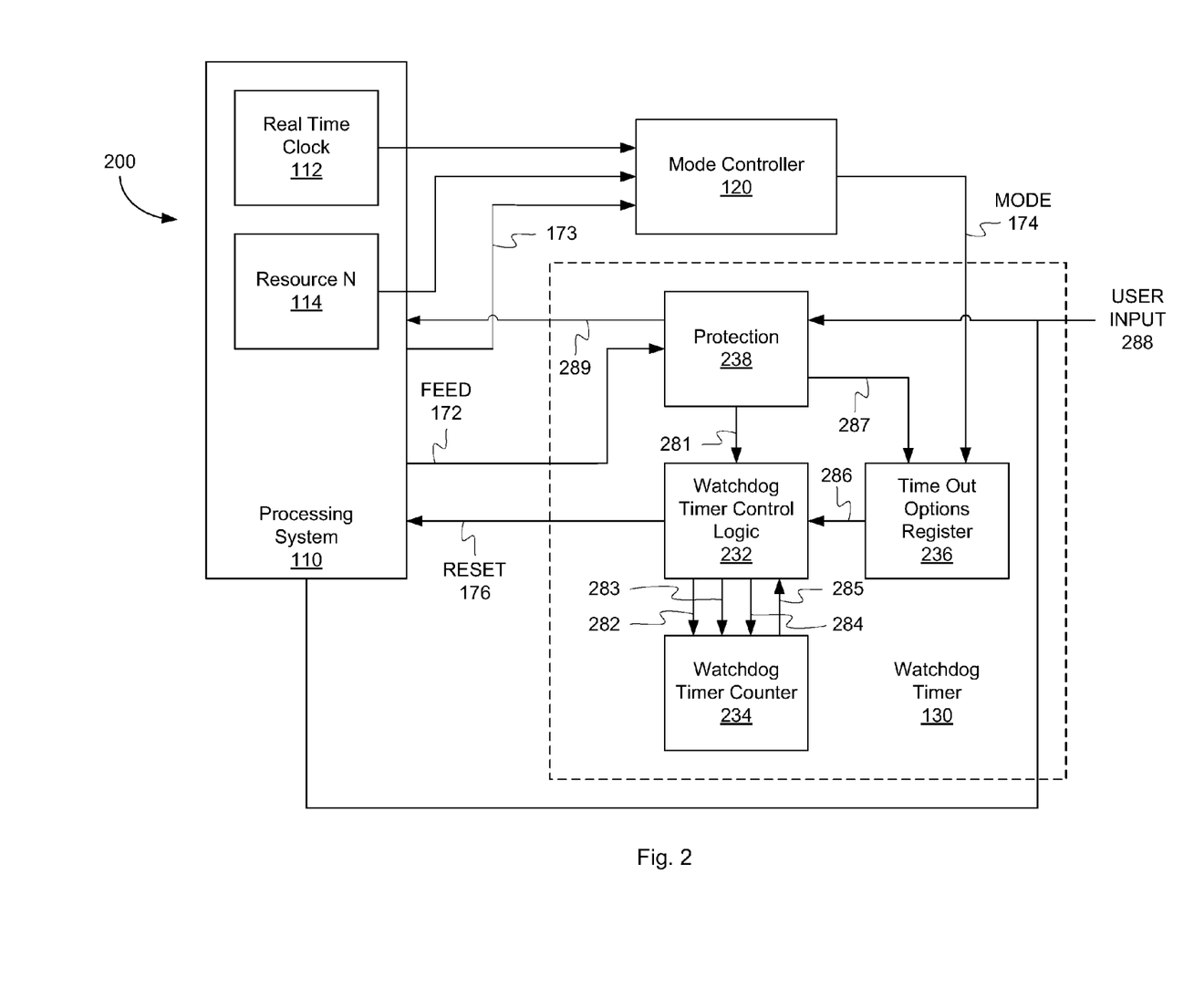
FIG. 2 is a block diagram illustrating a watchdog timer with mode dependent time out according to an embodiment.

FIG. 2 is a block diagram illustrating a watchdog timer with mode dependent time out according to an embodiment of the present invention. In one embodiment, system 200 includes processing system 110, mode controller 120 and watchdog timer 130. In this embodiment, watchdog timer 130 includes watchdog timer control logic 232, counter 234, and time out options register 236. Watchdog timer 130 may also optionally include protection logic 238. As discussed above, watchdog timer 130 has a time out value that is dependent upon a mode of operation of processing system 110. Watchdog timer 130 receives an indication of the mode of operation through MODE signal 174. MODE signal 174 is received by time out options register 236. In one embodiment processing system 110 may include one or more resources, such as real time clock 112 and other resources 114. The state of these resources of processing system 110 may be observed by mode controller 120 to detect a change in the mode of operation.

In one embodiment, time out options register 236 may be a programmable register able to accept any time out values. In another embodiment, time out options register 236 may have predefined constant time out values that can be selected through user input or by input from processing system 110. Time out options register 236 may store a number of time out values corresponding to the various modes of operation. For example, a time out value of 32 milliseconds (ms) may be associated with a normal mode of operation. In one embodiment, 32 ms may be the default time out value used in the absence of a change to the time out value. In addition, time out options register 236 may store other time out values corresponding to other modes of operation, such as 4 ms for a high-speed mode of operation or 2 seconds for a low-power or sleep mode of operation. In other embodiments, time out options register may store any number of other time out values. In one embodiment, the time out values stored in time out options register 236 may be set through user input 288. The time out value selection indicated by MODE signal 174 is provided to watchdog timer control logic 232 through signal 286.

Watchdog timer control logic 232 manages operation of watchdog timer 130. Watchdog timer control logic 232 provides an enable signal 282 to counter 234 to enable operation during hardware initialization. In one embodiment, watchdog timer 130 may be disabled during initialization. In another embodiment, watchdog timer 130 may have a default time out value set during initialization. In yet another embodiment, watchdog timer 130 may use one of the values stored in time out options register 236 during initialization. The time out value retrieved from time out options register 236 is stored in watchdog timer counter 234 through signal 283. Counter 234 times an interval, where the interval corresponds to a time out period associated with the current mode of operation. In certain embodiments, counter 234 may count down from the time out value to zero, count up from zero to the time out value, use a capacitor discharge timing method, or use another timing method to determine that the interval has passed. In one embodiment, time out signal 283 is applied to counter 234 automatically upon receiving an indication of a mode change through signal 174. In another embodiment, watchdog timer control logic 232 may wait until FEED signal 172 is received from processing system 110 before applying time out signal 283 to counter 234 to update the time out value. In yet another embodiment, control logic 232 may automatically restart counter 234 through signal 284 at the same time as the new time out value is applied to counter 234.

Processing system 110 periodically sends FEED signal 172 to watchdog timer 130. In certain embodiments, watchdog timer 130 may be implemented in hardware, software, firmware, or a combination thereof. FEED signal 172 may indicate that processing system 110 is functioning properly and is not in need of a system reset. In one embodiment FEED signal 172 is received by watchdog timer control logic 232. Upon receiving FEED signal 172, watchdog timer control logic 232 provides a signal 284 to counter 234 causing counter 234 to restart the interval. Counter 234 begins the count down again from the time out value. As long as FEED signal 172 is received, and counter 234 is reset to the time out value before the count down expires, watchdog timer 130 will not reset processing system 110.

In the event that counter 234 expires (i.e., reaches the end of the interval), watchdog timer counter 234 provides an indication 285 to watchdog timer control logic 232 causing the assertion of RESET signal 176 on processing system 110. In one embodiment, rather than RESET signal 176, a processor interrupt may be generated instead. The processor interrupt may include a non-maskable interrupt (NMI), a standard vectored interrupt request (IRQ) or other interrupt. In one embodiment, the option of RESET signal 176 or a processor interrupt is dependent on the mode of operation of processing system 110. For example, when processing system 110 is a normal active mode of operation, watchdog timer control logic 232 may be configured to provide RESET signal 176 upon expiration of the time out period, while generating a processor interrupt if processing device is in a low-power or sleep mode. In another example, the reverse may be true, where RESET signal 176 is used to safely handle the cause of the watchdog timer timeout in sleep mode, but in active mode processor interrupt may be adequate to safely manage the watchdog timer event. The expiration of counter 234 is caused by the failure to receive a FEED signal 172 during the time out period. Generally, the failure to receive FEED signal 172 means that software running on processing system 110 has become hung or otherwise suffered an error. In one embodiment, RESET signal 176 may cause processing system 110 to reset the system hardware as well as restart the system software.

In one embodiment, watchdog timer 130 employs protection logic 238 to prevent unauthorized reconfiguration of watchdog timer 130. FEED signal 172 may be received at protection logic 238 before being provided to watchdog timer control logic 232. Protection logic 238 may employ a protection scheme, such as a key-based time window protection mechanism. The protection mechanism may verify that a key (e.g. a unique bitstream or bit pattern) has been provided in order reload the time out value in counter 234. A correct key allows access to reload the time out value for either a predetermined period of time or for a set number of clock cycles. In one embodiment the received key may be compared to a copy of the key stored in a register, to determine if they match. Upon expiration of that period, watchdog timer will be locked and any further access denied until another key is provided. In one embodiment, any attempt to modify the time out value without the proper key may result in a reset of processing system 110. A correct key sent with FEED signal 172 may cause protection logic 238 to forward the feed signal to watchdog timer control logic 232 through signal 281.

In one embodiment, the time out values associated with different modes of operation that are stored in time out options register 236 are received from user input 288. A user may define the time out values used for each mode of operation using software instructions in a file that is compiled, with the resulting setting being interpreted at the compile time and used to generate constants that are stored in a non-volatile element of the device, such as time out options register 236. Time out options register 236 may be protected to prevent the values being changed by firmware after the device has been programmed. In another embodiment, the user may make such a configuration using a graphical user interface (GUI) which is part of an Integrated Development Environment (IDE). In yet another embodiment, the time out values are received from processing system 110. In other embodiments, the time out values may be received from other sources or from a combination of these sources. The time out value input may be received by watchdog timer 130 at protection logic 238. A similar key-based time window protection mechanism may be employed to prevent unauthorized access to the time out values in time out options register 236. For example, when user input signal 288 updates a time out value associated with a first mode of operation, a key is provided with the request. A correct key allows access to modify the time out value for either a predetermined period of time or for a set number of clock cycles. Upon expiration of that period, watchdog timer will be locked and any further access denied until another key is provided. A correct key sent with user input signal 288 may cause protection logic 238 to forward the input signal to time out options register 236 through signal 287.

In one embodiment, protection logic 238 may return a success message 289 to processing system 110, or other system, when the time out value is successfully updated or reloaded. The limited time period allowed by the time window protection mechanism, leaves the system susceptible to a time out if a disruption, such as an interrupt request (IRQ) occurs after the key has been provided but before the time out value can be updated. Such a disruption could prevent the update of the time out value before the period of the protection mechanism expires. The success message indicates that the time out value was updated and that the processing system does not need to re-request the update.

Figure 3:
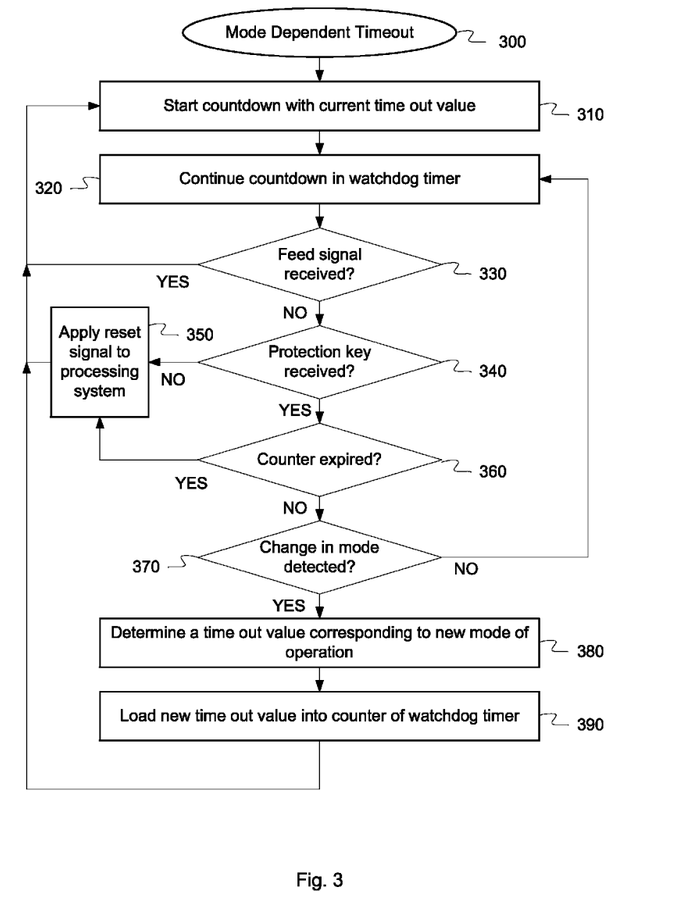
FIG. 3 is a flowchart illustrating a method of operating a watchdog timer with mode dependent time out according to an embodiment.

FIG. 3 is a flowchart illustrating a method 300 of operating a watchdog timer with mode dependent time out according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 300 is performed by watchdog timer 130 of FIG. 2.

In one embodiment at block 310, method 300 starts the countdown of counter 234 from the current time out value. The current time out value may be the value stored in time out options register 236 corresponding to the current mode of operation of processing system 110. If watchdog timer 130 is being initiated for the first time following a system reset, the time out value may be set to a default value. At block 320, watchdog timer counter 234 continues to count down from the time out value to zero.

At block 330, method 300 determines whether a feed signal, such as FEED signal 172 has been received from processing system 110. In certain embodiments, the application of FEED signal 172, may be referred to as "feeding the watchdog," "kicking the watchdog," "servicing the watchdog," or some other term. If at block 330, method 300 determines that a feed signal has been received, method 300 resets counter 234 to the current time out value and begins the countdown again at block 310. If at block 330, method 300 determines that a feed signal has not been received, method 300 proceeds to block 340. At block 340, method 300 determines whether the proper protection key has been received along with the feed signal. In one embodiment, if the feed signal does not include the proper protection key, method 300 resets the processing system 110 at block 350. If at block 340, method 300 determines that the proper protection key has been received, method 300 proceeds to block 360.

At block 360, method 300 determines if the counter 234 has expired. In one embodiment, counter 234 expires when the value of counter 234 reaches zero or some other predetermined value. If counter 234 expires, method 300 applies a reset signal to processing system 110 at block 350. After processing system 110 has been reset, the counter 234 in watchdog timer 130 begins the count down again at block 310. In one embodiment, after a reset of processing device 110, counter 234 is loaded with the same time out value as it had before the reset. In another embodiment, after the reset, counter 234 is loaded with a default time out value.

If at block 360, method 300 determines that counter 234 has not expired, method 300 proceeds to block 370. At block 370, method 300 determines whether a change in the mode of operation in processing system 110 has been detected. In one embodiment, the mode of operation may be provided directly by processing system 110 through signal 173. In other embodiments, mode controller 120 may observe the state of various system resources to determine the mode of operation. If at block 370, no change has been detected, method 300 returns to block 320. If a change in the mode of operation of processing system 110 has been detected, method 300 proceeds to block 380.

At block 380, method 300 determines a new time out value corresponding to the new mode of operation detected at block 360. In one embodiment, method 300 retrieves the new value from time out options register 236, which may store one or more time out values corresponding to each of the possible modes of operation of processing system 110. At block 390, method 300 loads the new time out value determined at block 380 into counter 234. In one embodiment, the time out value may be infinite causing the watchdog timer 130 to be disabled during the current mode of operation. Method 300 returns to block 310 and counter 234 begins to count down from the new time out value.

Figure 4:
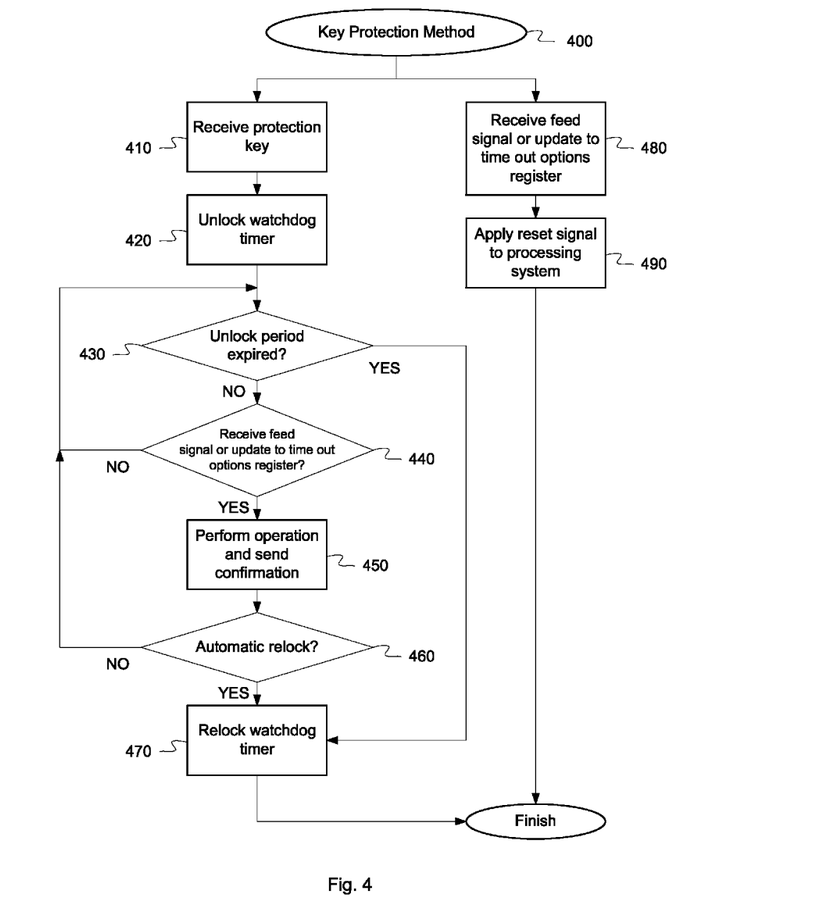
FIG. 4 is a flowchart illustrating a key protection method for a watchdog timer with mode dependent time out according to an embodiment.

FIG. 4 is a flowchart illustrating a key protection method 400 for a watchdog timer with mode dependent time out according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 is performed by watchdog timer 130 of FIG. 2.

In one embodiment at block 410, method 400 receives a protection key. The key may be received at protection logic block 238 of watchdog timer 130. If the key is correct, at block 450, method 400 unlocks watchdog timer 130. When the watchdog timer 130 is unlocked, access may be allowed that would otherwise have been prohibited. A correct key may allow access to the watchdog timer 130 for a certain period which may be either a predetermined period of time or for a set number of clock cycles. At block 430, method 400 determines whether the unlock period has expired. If the unlock period has expired, method 400 relocks the watchdog timer at 470, preventing further access.

If at block 430, method 400 determines that the unlock period has not expired, method 400 proceeds to block 440. At block 440, method 400 determines whether a feed signal has been received from processing system 110 or whether a request to update the time out values stored in time out options register 236 has been received. If neither the feed signal nor the update request has been received, method 400 returns to block 430. If one of the feed signal or the update request is received at block 440, at block 450 method 400 restarts the time out period or updates one or more time out values stored in time out options register 236. Method 400 further sends a confirmation signal to the requesting system indicating success at block 450.

At block 460, method 400 determines whether an automatic relock options has been activated. In one embodiment, at block 470, method 400 may relock watchdog timer 130 automatically after the first operation is performed at block 450. In other embodiments where automatic relock is not activated, method 400 may perform multiple operations with the watchdog timer 130 being relocked after a predetermined period of time or a set number of clock cycles have occurred.

In one embodiment, at block 480 method 400 may receive a feed signal or an update to the time out options register 236 without an accompanying protection key at block 480. At block 490, method 400 may optionally apply a reset signal to processing system 110, causing the processing system to reset.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
receiving an indication of a change in a mode of operation in a processing system having a time out functionality, wherein the change in the mode of operation comprises at least one of a change in operating frequency of the processing system or a change in power used by the processing system;
changing a first time out period to a second time out period in response to the change in the mode of operation; and
in response to an expiration of the second time out period, providing a signal to the processing system.

2. The method of claim 1, wherein providing the signal comprises providing at least one of a reset signal or an interrupt request.

3. The method of claim 2, wherein providing the signal comprises providing the reset signal when the processing system is in a normal mode of operation.

4. The method of claim 2, wherein providing the signal comprises providing the interrupt request when the processing system is in a low power mode of operation.

5. The method of claim 1, wherein the processing system comprises at least one watchdog timer to implement the time out functionality.

6. The method of claim 5, further comprising:
receiving a watchdog timer feed signal; and
changing the first time out period to the second time out period upon receiving the watchdog timer feed signal.

7. The method of claim 6, wherein the first time out period is different than the second time out period.

8. An apparatus comprising:
a processing system;
a mode controller coupled to the processing system, the mode controller to establish a change in a mode of operation of the processing system, wherein the change in the mode of operation comprises at least one of a change in operating frequency of the processing system or a change in power used by the processing system; and a time out circuit coupled to the processing system and the mode controller, the time out circuit configured to change a time out period from a first time out period to a second time out period in response to the change in the mode of operation of the processing system, and, in response to an expiration of the second time out period, provide a signal to the processing system.

9. The apparatus of claim 8, wherein to provide the signal, the time out circuit to provide at least one of a reset signal or an interrupt request, based on the mode of operation of the processing system.

10. The apparatus of claim 9, wherein to provide the signal, the time out circuit to provide the reset signal when the processing system is in a normal mode of operation.

11. The apparatus of claim 9, wherein to provide the signal, the time out circuit to provide the interrupt request when the processing system is in a low power mode of operation.

12. The apparatus of claim 8, wherein the time out circuit comprises at least one watchdog timer to measure the first time out period and the second time out period.

13. The apparatus of claim 12, wherein the time out circuit comprises a control circuit configured to:
receive a watchdog timer feed signal; and
change the time out period of the watchdog timer circuit upon receiving the watchdog timer feed signal.

14. The apparatus of claim 8, wherein the first time out period is different than the second time out period.

15. The apparatus of claim 8, wherein to establish a change in a mode of operation of the processing system, the mode controller to at least one of detect the mode of operation or set the mode of operation.

16. An apparatus comprising:
a processing system having a time out functionality;
a first circuit configured to change a time out period from a first time out period to a second time out period in response to a change in a mode of operation of the processing system, wherein the first time out period is different than the second time out period; and
a second circuit configured to provide a signal to the processing system in response to an expiration of the second time out period, wherein the change in the mode of operation comprises at least one of a change in operating frequency of the processing system or a change in power used by the processing system.

17. The apparatus of claim 16, wherein the first circuit configured to change the time out period is further configured to operate during active operation of the processing system.

18. The apparatus of claim 16, wherein to provide the signal, the second circuit to provide at least one of a reset signal or an interrupt request, based on the mode of operation of the processing system.

19. The apparatus of claim 18, wherein to provide the signal, the second circuit to provide the reset signal when the processing system is in a normal mode of operation.

20. The apparatus of claim 18, wherein to provide the signal, the second circuit to provide the interrupt request when the processing system is in a low power mode of operation.

* * * * *